US008626643B2

(12) United States Patent
Verfuerth et al.

(10) Patent No.: US 8,626,643 B2
(45) Date of Patent: Jan. 7, 2014

(54) SYSTEM AND METHOD FOR A UTILITY FINANCIAL MODEL

(75) Inventors: Neal R. Verfuerth, Plymouth, WI (US); Michael H. Potts, Plymouth, WI (US)

(73) Assignee: Orion Energy Systems, Inc., Manitowoc, WI (US)

( * ) Notice: Subject to any disclaimer, the term of this patent is extended or adjusted under 35 U.S.C. 154(b) by 860 days.

(21) Appl. No.: 11/744,083

(22) Filed: May 3, 2007

(65) Prior Publication Data

US 2008/0275802 A1 Nov. 6, 2008

(51) Int. Cl.
*G06Q 40/00* (2012.01)

(52) U.S. Cl.
USPC ...... 705/38; 705/7; 705/35; 705/60; 702/130; 236/16

(58) Field of Classification Search
USPC ............... 702/60, 130; 705/7, 35, 38; 236/16
See application file for complete search history.

(56) References Cited

U.S. PATENT DOCUMENTS

| 4,023,043 | A | 5/1977 | Stevenson |
| 4,135,181 | A | 1/1979 | Bogacki et al. |
| 4,190,800 | A | 2/1980 | Kelly, Jr. et al. |
| 4,204,194 | A | 5/1980 | Bogacki |
| 4,204,195 | A | 5/1980 | Bogacki |
| 4,360,881 | A | 11/1982 | Martinson |
| 4,489,386 | A | 12/1984 | Breddan |
| 5,426,620 | A | 6/1995 | Budney |
| 5,572,438 | A | 11/1996 | Ehlers et al. |
| 5,644,173 | A | 7/1997 | Elliason et al. |
| 5,717,609 | A | * 2/1998 | Packa et al. ................... 702/130 |
| 5,758,331 | A | 5/1998 | Johnson |
| 5,956,462 | A | 9/1999 | Langford |
| 6,122,603 | A | 9/2000 | Budike, Jr. |
| 6,169,979 | B1 | 1/2001 | Johnson |
| 6,528,957 | B1 | 3/2003 | Luchaco |
| 6,535,859 | B1 | 3/2003 | Yablonowski et al. |
| 6,622,097 | B2 | 9/2003 | Hunter |
| 6,633,823 | B2 | 10/2003 | Bartone et al. |
| 6,785,592 | B1 | 8/2004 | Smith et al. |
| 6,828,695 | B1 | 12/2004 | Hansen |
| 6,832,135 | B2 | 12/2004 | Ying |
| 6,983,210 | B2 * | 1/2006 | Matsubayashi et al. ........ 702/60 |
| 7,130,832 | B2 | 10/2006 | Bannai et al. |
| 2001/0055965 | A1 | 12/2001 | Delp et al. |
| 2002/0082748 | A1 | 6/2002 | Enga et al. |
| 2002/0103655 | A1 | 8/2002 | Boies et al. |
| 2002/0162032 | A1 | 10/2002 | Gundersen et al. |
| 2003/0011486 | A1 | 1/2003 | Ying |
| 2003/0036820 | A1 | 2/2003 | Yellepeddy et al. |
| 2003/0041017 | A1 | 2/2003 | Spool et al. |

(Continued)

OTHER PUBLICATIONS

Physics Part I and II; Robert Resnick et al. John Wiley & Sons, Inc. 1967.*

(Continued)

*Primary Examiner* — Harish T Dass
(74) *Attorney, Agent, or Firm* — Foley & Lardner LLP

(57) ABSTRACT

A utility financial model involves the setting of a new utility rate after the introduction of a new utility technology that provides immediate capacity relief, reducing the base load capacity and the peak load capacity to electric power providers. The new utility rate is not based solely on performance of the new utility technology but rather based on fixed and variable costs to introduce the new utility technology.

7 Claims, 3 Drawing Sheets

(56) References Cited

U.S. PATENT DOCUMENTS

| | | |
|---|---|---|
| 2003/0041038 A1 | 2/2003 | Spool et al. |
| 2003/0046252 A1 | 3/2003 | Spool et al. |
| 2003/0084358 A1 | 5/2003 | Bresniker et al. |
| 2003/0084359 A1 | 5/2003 | Bresniker et al. |
| 2003/0093332 A1 | 5/2003 | Spool et al. |
| 2003/0171851 A1 | 9/2003 | Brickfield et al. |
| 2004/0006439 A1 | 1/2004 | Hunter |
| 2004/0024483 A1 | 2/2004 | Holcombe |
| 2004/0078153 A1 | 4/2004 | Bartone et al. |
| 2004/0078154 A1 | 4/2004 | Hunter |
| 2004/0095237 A1 | 5/2004 | Chen et al. |
| 2004/0128266 A1 | 7/2004 | Yellepeddy et al. |
| 2004/0193329 A1 | 9/2004 | Ransom et al. |
| 2005/0027636 A1 | 2/2005 | Gilbert et al. |
| 2005/0034023 A1 | 2/2005 | Maturana et al. |
| 2005/0035717 A1 | 2/2005 | Adamson et al. |
| 2005/0038571 A1 | 2/2005 | Brickfield et al. |
| 2006/0065750 A1* | 3/2006 | Fairless .................. 236/46 R |
| 2008/0147465 A1* | 6/2008 | Raines et al. .................... 705/7 |

OTHER PUBLICATIONS

L. R. Harris et al. "Pacific Northwest Laboratory's Lighting Technology Screening Matrix"; PNL-SA-23871; Apr. 1994; U.S. Department of Energy; Pacific Northwest Laboratory, Richland, Washington 99352.*

BigHorn Home Improvement Center Energy Performance Michael Deru, Shanti D Pless, Paul A Torcellini. ASHRAE Transactions. Atlanta: 2006. vol. 112 Part 2. p. 349, 18 pgs.*

* cited by examiner

SYSTEM AND METHOD FOR A UTILITY FINANCIAL MODEL

FIELD

The present disclosure relates to utility management systems and, more particularly, to systems and methods for a utility financial model.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Several references describe methods and systems for managing electrical power consumption. For example, U.S. Pat. No. 5,644,173 discloses a method for real time load shedding based on a tier pricing agreement between the utility and an energy consumer. The load shedding is implemented by first receiving a signal from the utility company that load shedding is necessary to maintain the tier pricing. The signal is then communicated to processors which determine where loads should be shed and then shed the appropriate loads at the energy consumer's location.

U.S. Pat. No. 6,535,859 discloses a system and method for charging a fee to an end user where a service company services a lighting system of the end user's facility. To determine the fee, an original power consumption of the facility is determined before the lighting system is retrofitted with at least one power savings device. The lighting system is retrofitted with the at least one power saving device and a new power consumption is measured of the facility. The fee is charged to the end user, such that the fee is a function of a difference between the original power consumption and the new power consumption.

U.S. Pat. No. 6,633,823 discloses a system and method for monitoring and controlling energy usage at various facilities to allow aggregate control over power consumption. A central location communicates with facilities and monitors power usage in each facility. To avoid expensive spikes in power consumption, when the central location senses a problem or excessive energy usage, it remotely controls power consuming devices at the facility.

U.S. Pat. No. 6,785,592 discloses a business method for optimizing energy usage at facilities. The energy consumption of each facility is monitored to detect economic inefficiencies. Based on contractual agreements with energy providers, devices in the facilities are remotely controlled to avoid any economic inefficiency.

U.S. Pat. No. 7,130,832 discloses a system and method where an energy service enterprise measures energy consumption after taking the energy-saving measures, calculates the amount of curtailed energy cost by comparing the measured value with the energy consumption before taking the energy-saving measures previously stored in the database, and receives at least a part of the curtailed amount. The customer is not required to plan equipment investment in energy-saving measures and collection thereof.

U.S. Published Patent Application No. 2003/0046252 discloses a business management system for taking advantage of energy providers' special offers. Load profiles for energy consumers are created such that the appropriate special offer is offered by a direct energy provider. An indirect energy provider then negotiates the offer with the direct energy provider and the indirect energy provider supplies power to the end users.

U.S. Published Patent Application No. 2004/0095237 (the "'237 application") discloses a method and system for remote monitoring and controlling of equipment within a facility to control energy consumption. The remote monitoring and control is implemented by the utility, the government, or any other third party.

Other references for electric power utility management by an end user include U.S. Pat. Nos. 4,489,386; 5,426,620; 5,572,438; 6,122,603; 6,528,957; and 6,622,097; U.S. Published Patent Appl. Nos. 2003/0084358; 2003/0084359; 2003/0171851; 2004/0006439; 2004/0024483; 2004/0078154; 2004/0128266; 2005/0035717; and 2005/0038571. References for electric power utility management by an energy supplier include U.S. Pat. Nos. 4,023,043; 4,135,181; 4,190,800; 4,204,194; 4,204,195; 4,360,881; 5,956,462; 6,828,695; and 6,832,135; and U.S. Published Patent Appl. Nos. 2002/0082748; 2002/0103655; and 2002/0162032. References for electric power utility management methods include U.S. Pat. Nos. 5,758,331 and 6,169,979; and U.S. Published Patent Appl. Nos. 2001/0055965; 2003/0011486; 2003/0036820; 2003/0041017; 2003/0041038; 2003/0093332; 2004/0078153; 2004/0193329; 2005/0027636; and 2005/0034023.

SUMMARY

According to an exemplary embodiment, a utility financial model involves the setting of a new utility rate after the introduction of a new utility technology that provides immediate capacity relief and reduces the base load capacity and the peak load capacity to electric power providers. The new utility rate is not based solely on performance of the new utility technology but rather based on fixed and variable costs to introduce the new utility technology.

Another aspect relates to a method for financing installation of a new utility technology after installation of the new utility technology. The method includes obtaining power reduction information resulting from change from a first technology to a second technology, receiving technology cost information including fixed and variable costs to install and maintain the second technology, and calculating a new utility rate for use of the second technology and to repay technology costs associated with the second technology, the new utility rate comprising an accounting for received technology cost information of the second technology and power reduction information.

Yet another aspect relates to a system for financing installation of a new utility technology where up front payments are avoided or reduced. The system includes a metering device measuring capacity relief resulting from change from a first technology to a second technology and a processor with programmed instructions for determining aggregate displaced capacity from use of the second technology and a new utility rate based on costs associated with the change to the second technology and power reduction.

Yet still another aspect relates to a system for providing power at a reduced cost. The system includes a utility meter coupled to new technology which measures utility usage on an absolute and real-time basis, a processor coupled to the utility meter which receives measurements of utility usage from the utility meter and calculates a new utility rate based on utility usage and technology costs, and a communication interface which communicates information needed to provide a utility invoice based on the new utility rate.

These and other features, aspects and advantages of the present invention will become apparent from the following description, appended claims, and the accompanying exemplary embodiments shown in the drawings, which are briefly described below.

DETAILED DESCRIPTION OF EXEMPLARY EMBODIMENTS

Exemplary embodiments will be described below with reference to the accompanying drawings. It should be understood that the following description is intended to describe exemplary embodiments of the invention, and not to limit the invention.

Figure 1:
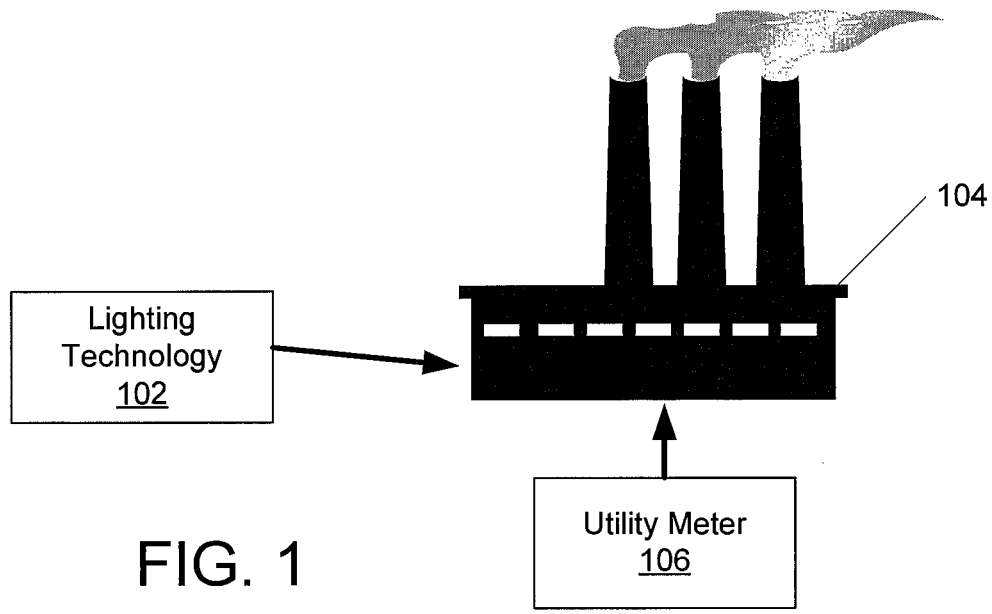
FIG. 1 is a diagram illustrating an application of a utility financial model in accordance with an exemplary embodiment.

FIG. 1 illustrates an exemplary application of a utility financial model. In this model, a lighting technology 102 replaces traditional industrial/commercial light fixtures on a one for one basis within a commercial or industrial setting 104. The lighting technology 102 can be new, more efficient lighting fixtures; new non-utility light providers (e.g., sunlight); or a combination of utility-based and non-utility based lighting. An exemplary impact is a 50% reduction in base load energy use and a greater quantity of higher quality light. Moreover, with additional controls, the technology may provide an additional 25-50% in instantaneous peak load capacity relief. In addition to the lighting technology installation, a metering system 106 is installed to document and verify the capacity relief. A new rate is set for the commercial or industrial setting 104 based on the return needed and the kilowatt reduction experienced. In an exemplary embodiment, the metering system 106 provides real-time utility usage data such that the metering of power usage is absolute.

Installation of the lighting technology 102 can be paid for utilizing a reduced unit-based payment scheme where one or more payments are made by the consumer. Payments are tied to units of utility reduction rather than time. As such, the financial model is not a lease of equipment. The model is a purchase of use or throughput with a reduced utility rate for calculation of payment due to increased efficiencies from the new lighting technology 102. The payments can be over time or in one lump sum.

Figure 2:
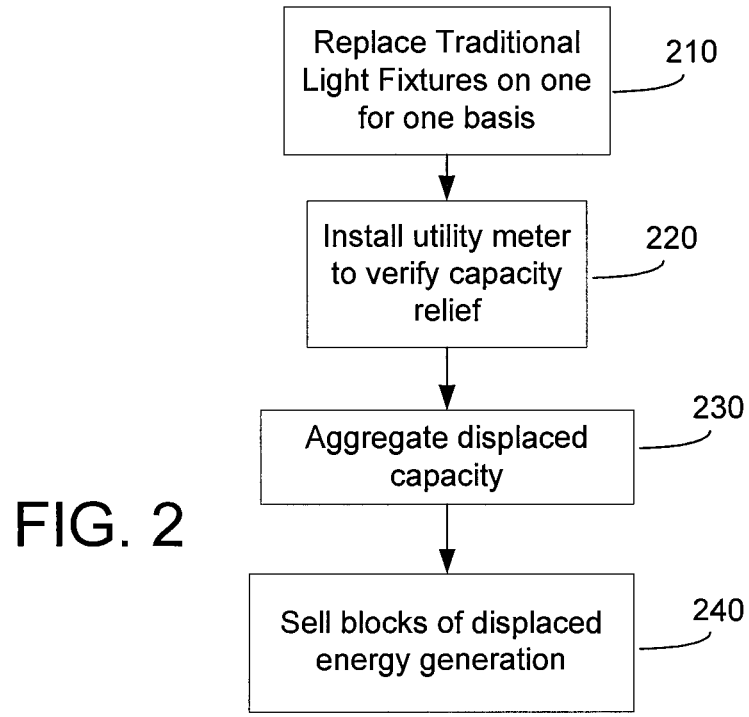
FIG. 2 is a flow diagram depicting operations performed in a utility financial model in accordance with an exemplary embodiment.

FIG. 2 illustrates a flow diagram depicting operations performed in the utility financial model of FIG. 1. Additional, fewer, or different operations may be performed depending on the particular implementation. In an operation 210, traditional light fixtures in a facility are replaced on a one for one basis with new more efficient fixtures. As such, each lighting fixture is replaced by another light fixture, rather than two light fixtures being replaced by one light fixture. In alternative embodiments, a certain number of exiting lights are replaced by one new light fixture. In yet another embodiment, natural lighting features (e.g., sunlight) are utilized in conjunction with new utility-based features. In an operation 220, a utility meter is installed at the facility to verify the relief in utility capacity resulting from the installation of the new fixtures. Preferably, the metering is done using a utility-grade meter. Metering devices can also include communication components to communicate utility information to a remote location. In an operation 230, aggregate displaced capacity is determined based on information about the facility where new fixtures are installed and the amount of utility capacity relief. The aggregate displaced capacity can provide for data necessary to determine pollution allowances or credits earned and financial savings for the facility. In an operation 240, blocks of displaced energy generation are sold. For example, displaced energy can be sold on a market or to the original utility company.

By way of example, the installation of 4100 units of the new technology replacing traditional technology, can provide one (1) megawatt of base load capacity relief to the electrical system. The system creates blocks of displaced generation that can be sold to energy providers and public utilities in any increments of megawatt capacity required. The utility or energy provider realizes capacity gains at a much faster rate with this system than with the traditional methods of capacity expansion. The capacity gains are realized immediately upon installation of the system, instead of four to five years in the future as with the construction of a traditional utility generation facility.

In addition to the increase in capacity gains created, the system also generates a number of valuable ancillary effects, which benefit the greater community as a whole. For example, the system provides capacity relief without building increased generation; thus it provides a substantial degree of environmental pollutant relief. Furthermore, it has been documented that improved lighting systems increase worker productivity, reduce employee sick time and increase product quality, all of which benefit firms. Another advantage of the system is that it does not sell lights or conservation, rather it sells aggregated, displaced capacity to energy providers and public utilities.

A wide range of different traditional technologies can be replaced using the new technology. For example, the existing HID (high intensity discharge) lighting market in North America has been estimated to be 400,000,000 HID fixtures. Therefore, retrofitting the existing North American HID replacement market with the new technology included in the utility financial model can provide 97,560 MW of baseload capacity.

To address some of the impacts of the utility financial model on the economic development of a region, one must investigate the multiplier effects associated with the use of the model and the construction of a traditional generating facility. The multiplier effect refers to the additional income generated by an increase in planned investment/spending. In other words, a multiplier of 2 would imply that every $1 increase in planned investment would eventually generate $2 in income for the region's economy. The additional income is generated by the additional jobs and demand generated by the increased investment, which translates into greater disposable income for the region. The multiplier effect of an increased spending has three components: direct effects, indirect effects and induced effects. Direct effects refer to the increase in regional income associated with the workers and materials required to construct a traditional power plant or the installation of the exemplary model. Indirect effects refer to the increase in regional income associated with the workers and materials required to supply the raw materials/components required for the construction of a traditional power plant or the installation of the model to the end-use firms. Induced effects refer to the increase in regional income associated with the increase in demand for goods and services from regional firms associated with the increased disposable income in the region.

When investigating the multiplier effects of investing in a traditional power plant or the utility financial model, one must look at two separate multipliers, the general goods and services multiplier to be used to assess the impact of traditional plant construction and the installation of the utility financial model. To assess the impact of investment in traditional plant construction, the general economic multiplier of 2.06, as defined by the United States Department of Energy, is employed. To assess the impact of the installation of the utility financial model, on the other hand, the U.S. Department of Energy's energy efficiency investment multiplier of 2.32 per $1 invested is employed. The energy efficiency multiplier is higher because spending on energy efficiency initiatives (like the utility financial model) has a greater impact on the regional economy than traditional plant construction. In other words, a dollar invested in traditional generating capacity will generate $2.06 in income for the local economy, while an investment of $1 in the utility financial model will generate $2.32 of income for the local economy.

The following details the annual impact of the installation of a 97,560 MW using the utility financial model versus the construction of 97,560 MW of traditional generating capacity. There is capital cost savings of $425 Million, based on the difference in $925 Million (traditional) and $500 Million (new model). Cost savings with the new model include O&M+fuel costs of $22.0 Million per year, distribution costs of $660,000 per year, and transmission costs of $660,00 per year. The avoided energy costs associated with the installation of the new model can be calculated as O&M and fuel costs+distribution costs+transmission losses=$21.3 Million. The investment savings (amperage savings) is $100.3 Million.

The multiplier impact of implementing the new model can be summarized as follows:

| Traditional Generation: $1.91 Billion | | |
|---|---|---|
| | Investment | Multiplier |
| Generation: | $925 Million | $1.91 Billion |
| Total New Model: $2.04 Billion | | |
| | Investment/Savings | Multiplier |
| New Model Impact: | $500 Million | $1.16 Billion |
| Capital Differential: | $425 Billion | $0.88 Billion |
| Final Multiplier Impact: | | |
| Total New Model − Total Generation = $130 Million | | |

Therefore, if $925 Million spent on traditional capacity initiatives were invested in the new model, rather than building 500 Megawatts of coal-fired facility, an additional $130 Million would be generated in multiplier effects for the state of Wisconsin, for example.

The additional flow-through effects for the regional economy can be detailed as follows:

| | |
|---|---|
| Multiplier Impct: | $130 Million |
| O & M + Fuel Cost Multiplier: | $43.9 Million |
| Transmission+ Distribution Losses Multiplier: | $2.72 Million |
| Total Impact: | $176.6 Million |

The multiplier effect includes the $500 Million spent on the initiative times the 2.32 energy efficiency multiplier and since the new model requires $425 Million less in capital investments, these funds are freed up to be re-invested in the economy and will have the general economy multiplier effect of 2.06. Since the new model does not require spending on O&M+fuel costs ($22.0 Million), these savings can be reinvested into the economy and generate income with the general multiplier. Since the new model does not involve the transmission and distribution losses associated with a traditional generation system ($1.32 Million per year), these savings can be reinvested into the economy and generate income with the general multiplier.

The analysis above suggests that the installation of 500 Megawatts using the utility financial model described herein on a nationwide basis will provide an additional $176.6 Million increase to income where it is installed due to capital cost savings plus investment savings, investment savings, O&M cost savings, fuel cost savings and distribution cost savings multipliers. Similarly, if 97,560 Megawatts were installed on a nationwide basis, the utility financial model would provide an additional $60.3 Billion increase to income where it is installed due to capital cost savings plus investment savings, investment savings, O&M cost savings, fuel cost savings and distribution cost savings multipliers.

It should be noted these flow through effects capture the savings each customer received through the use of the utility financial model in their facilities. The reduction in energy consumption delivered by the utility financial model technologies is captured in the O&M+fuel cost savings. To see this, consider the following. For a one-customer market, the energy savings associated with the installation of the utility financial model would amount to the required reduction in energy generation for the utility.

Figure 3:
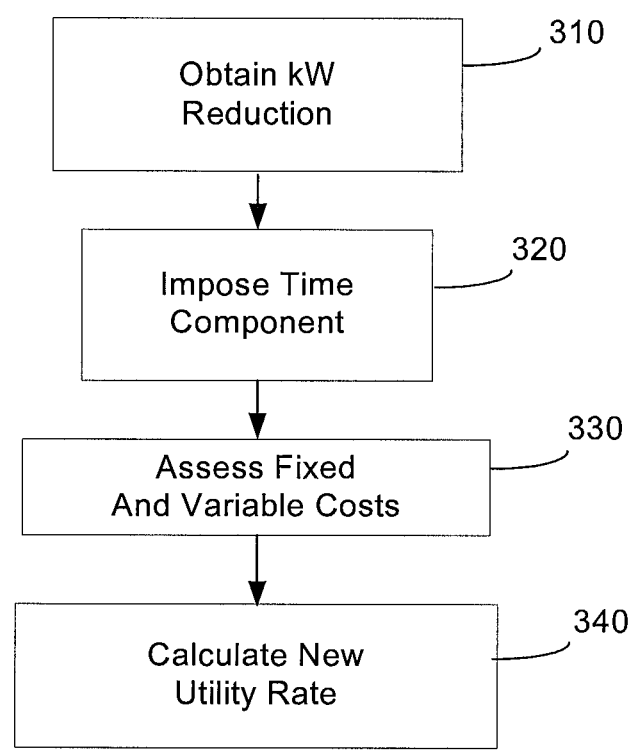
FIG. 3 is a flow diagram depicting operations performed in the establishment of a new utility rate in accordance with an exemplary embodiment.

FIG. 3 illustrates a flow diagram depicting operations performed in the establishment of a new utility rate after introduction of a new technology. Additional, fewer, or different operations may be performed depending on the particular implementation. In an operation 310, a figure for kilowatt (kW) power reduction is obtained. This power reduction quantifies the reduction in load achieved by the new technology. In an operation 320, a time component for use of the technology is imposed such that the power reduction can be represented in kilowatt hours (kWh). The time component can indicate actual usage of the new technology. In the case of a warehouse where a light fixture is on 24 hours a day, year round, this time component is added to the power reduction. In contrast, some fixtures may only be used for a certain fraction of time.

In an operation 330, fixed and variable costs for the technology change are assessed to determine a return needed to re-pay associated costs. Fixed costs can include equipment costs and installation fees. Variable costs can include maintenance fees. In an operation 340, a new utility rate for the facility having the technology change is calculated. The new rate is a function of the power reduction over the return needed from the technology change. By way of example, a new technology may reduce a facility's utility rate from 8¢ per fixture per hour to 2½¢. The new utility rate is not a performance based reduction based on utility usage. Rather, the new utility rate considers power reduction and an apportionment of the return needed to recoup costs for installation of the new technology. As such, utility consumers can benefit from a new technology without a large upfront expense. Consumers repay the installation costs in a functional calculation involving the resulting power reduction.

Figure 4:
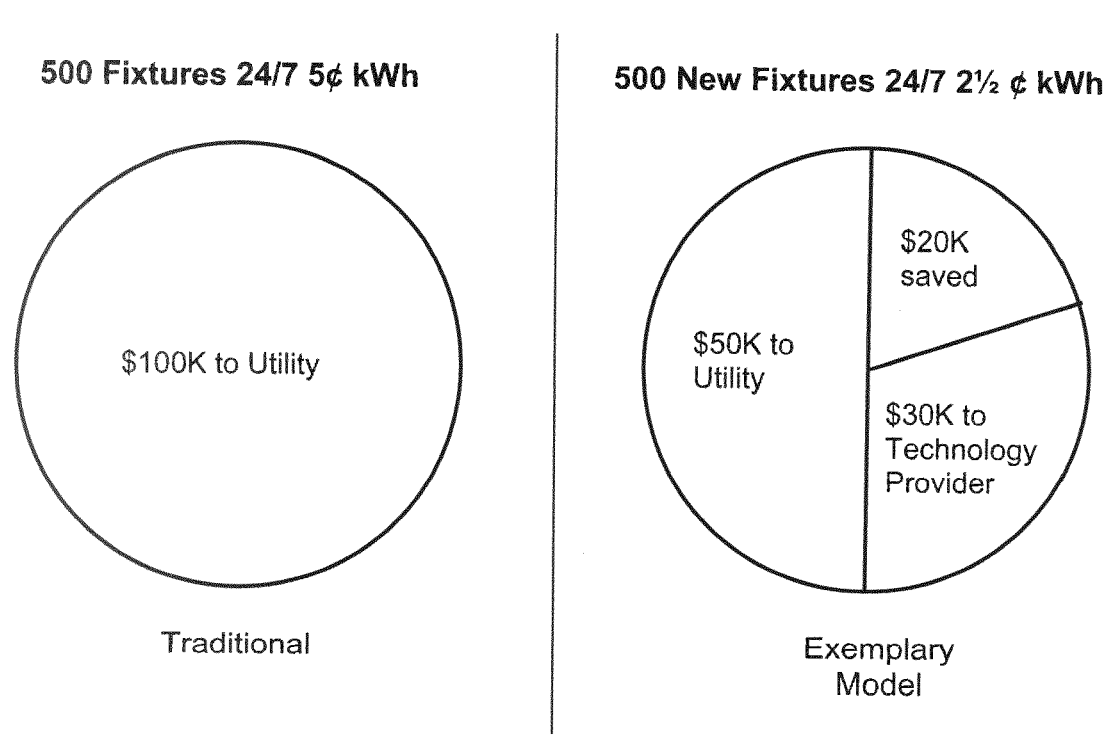
FIG. 4 is a graphical illustration of payment scenarios for a traditional utility model compared to the utility financial model described with reference to FIGS. 1-3.

FIG. 4 illustrates payment scenarios for a traditional utility model compared to the exemplary utility financial model described herein. The traditional model results in a payment scheme in which 100% of utility charges are paid to the utility company each year. For example, 500 fixtures running 24 hours a day, 7 days a week having a fee of 5¢ per kWh results in $100 k per year paid to the utility company.

The exemplary utility financial model results in a payment scenario which includes guaranteed cash flow to the utility consumer. In the example of 500 fixtures mentioned above, $50 k is paid to the utility company, $30 k is paid to the company providing the new technology, and $20 k is saved by the utility consumer as guaranteed cash flow. At the end of five years, the utility consumer is ahead by $100 k. At the end of a certain period of time when the technology change costs are repaid, the utility consumer no longer pays the new technology provider, enabling the consumer to save even more additional money.

In an alternative embodiment, the utility consumer makes a one time cash payment based on a calculation involving the reduced kWh. Payments for the new technology installation are tied to units and not to time.

Advantageously, implementation of a new technology using the exemplary utility financial model described herein reduces or eliminates technological and financial risk for the consumer. Further, the consumer is assured positive cash flow and is provided the measurement capabilities required for emission credits. Such emissions credits can be sold in the open market or on an exchange like the Chicago Climate Exchange, Inc.

The word "exemplary" is used herein to mean serving as an example, instance, or illustration. Any aspect or design described herein as "exemplary" is not necessarily to be construed as preferred or advantageous over other aspects or designs. Further, for the purposes of this disclosure and unless otherwise specified, "a" or "an" means "one or more."

The foregoing description of exemplary embodiments have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

The invention claimed is:

1. A method for financing installation of a new utility technology by a utility consumer after installation of the new utility technology at a facility associated with the utility consumer, the method comprising:
   obtaining, at a metering device, power usage information associated with operation of a second technology;
   calculating, at a processor and based on the power usage information obtained from the metering device, a power base load capacity relief of an electrical system to a utility provider resulting from change from a first technology to the second technology;
   receiving, at the processor, a technology cost including fixed and variable costs to install and maintain the second technology;
   calculating, at the processor, a return needed for repayment of the technology cost;
   determining, by the processor, a new utility rate by apportioning the return needed for repayment of the technology cost as a function of the power base load capacity relief; and
   calculating and providing a utility invoice to the utility consumer for a power reduction over time at the new utility rate, the power reduction over time provided by use of the second technology;
   wherein the amount billed to the utility consumer via the utility invoice is less than a cost savings attained by the utility consumer via the power base load capacity relief such that the amount billed to the utility consumer is financed via a portion of the cost savings.

2. The method of claim 1, wherein the new utility rate is not applied to actual energy use over time and the utility invoice does not request payment for energy use over time.

3. The method of claim 1, wherein calculating and providing the utility invoice are completed by the processor and a communications interface coupled to the processor.

4. The method of claim 1, wherein at least one of the new utility rate and the invoice accounts for the value of pollution credits gained through use of the second technology.

5. The method of claim 4, further comprising communicating pollution credit information to a trading exchange for trading of pollution credits.

6. The method of claim 1, wherein the metering device is coupled to the processor.

7. The method of claim 1, wherein payment of costs is the only repayment source for installation and maintenance of the second technology.

* * * * *